May 21, 1963 E. O. HAENNI 3,090,861
CELL FOR USE IN RADIATION ABSORPTION ANALYSIS
Filed Jan. 28, 1960
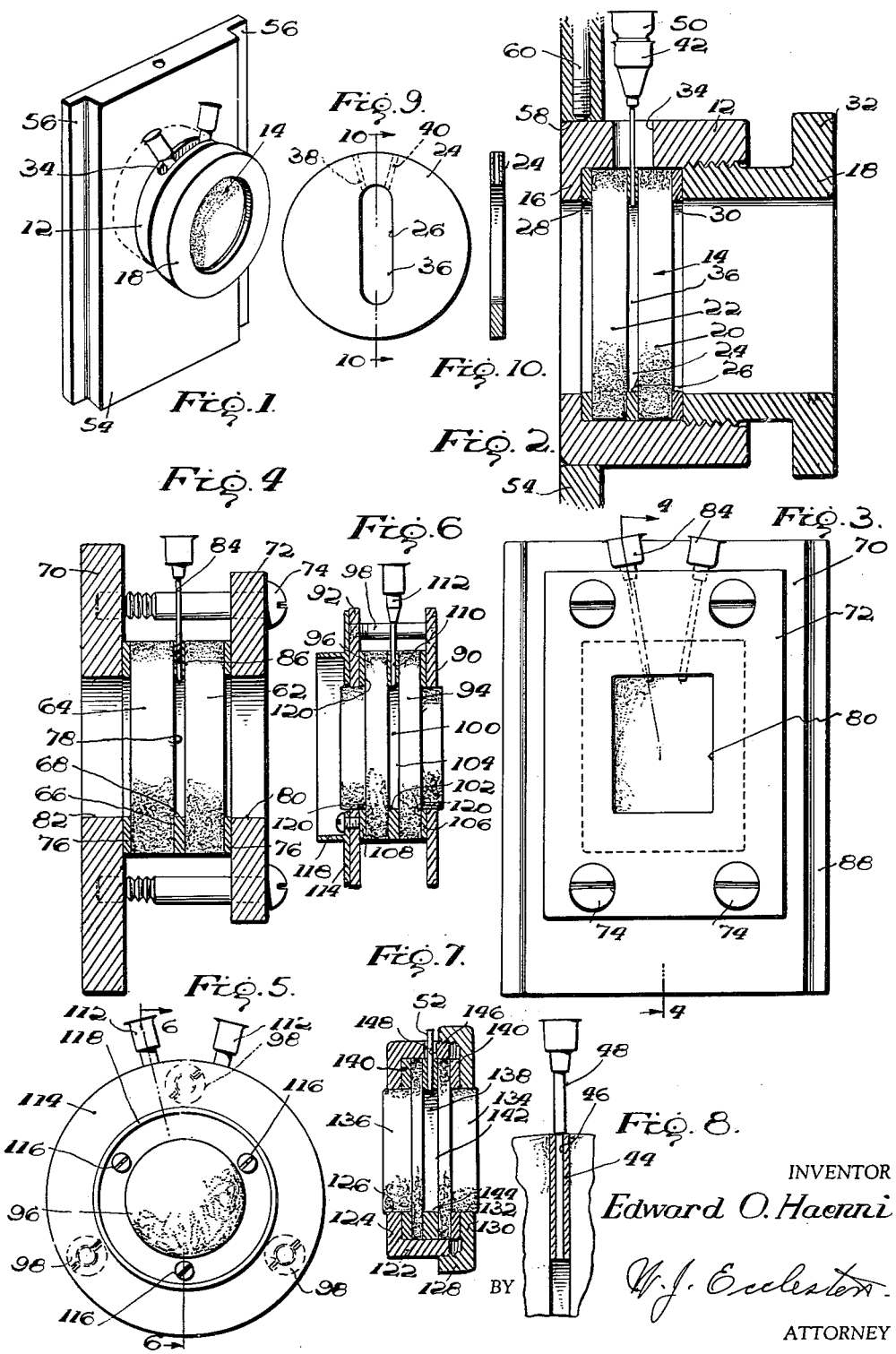
INVENTOR
Edward O. Haenni
BY W. J. Ecclesten
ATTORNEY United States Patent Office 3,090,861
Patented May 21, 1963

3,090,861
CELL FOR USE IN RADIATION ABSORPTION
ANALYSIS
Edward O. Haenni, Bethesda, Md., assignor to the United States of America as represented by the Secretary of the Department of Health, Education and Welfare
Filed Jan. 28, 1960, Ser. No. 5,323
12 Claims. (Cl. 250—43)
(Granted under Title 35, U.S. Code (1952), sec. 266)

The invention described herein, if patented, may be manufactured and used by or for the Government for governmental purposes, without the payment to me of any royalty thereon.

The present invention relates to absorption cells and more particularly to a sample holding absorption cell of greatly simplified construction for use in infrared radiation absorption analysis or similar analytical work.

The sample holding absorption cells now used in analytical apparatus, such as spectrophotometers, for example, comprise a pair of optically polished rock salt (or other halide salt) window plates separated by a thin circular or polygonal spacer with a central aperture. These window plates are clamped between heavy, front and back pressure-applying members with sufficient force to form a fluid-tight seal between the spacer and the two window plates. A fluid-tight sample chamber is thus formed between the window plates, the boundary of which is defined by the inner periphery of the spacer. Suitable openings in the front and back pressure-applying members define windows which register with the sample chamber. Liquid under test is admitted to the sample chamber of conventional absorption cells either from the front or from the rear end of the cell. Assuming for the purpose of explanation that the cell is designed to admit fluid under test from the rear end thereof, the back pressure-applying member and back window plate and a sealing gasket which must be interposed between these two members to seal the interface between them are provided with a first series of relatively minute drilled passages and ports disposed to register when the parts are in assembled relation through which ports and passages liquid under test is admitted to the sample chamber. A second series of passages and ports similar to the first is also provided to vent the air in the sample chamber when it is being filled with fluid. Alternately, two series of ports and passages, similar to those above-mentioned, may be drilled in the front window plate, a gasket between this plate and the front pressure-applying member, and in the latter when it is desired to admit fluid from the front rather than the rear ends of the cell assembly.

These ports and passageways normally approximate one millimeter in diameter. In view of the small size of these ports and passageways, the fact that the front and back pressure-applying members for the cells are made of stainless steel because of the corrosiveness of the salt window plates in conjunction with the metal and liquids under test and the fact that they must be accurately drilled to register properly, the drilling of these ports and passageways accounts for a large share of the cost of present-day absorption cells. Additional costs are engendered by the thickness of the pressure-applying members required to apply sufficient force to seal the cell and by the fact that the pressure-applying members in contact with the drilled sealing gasket must be machined almost optically flat to prevent leakage at this interface. Moreover, the presence of the inlet and outlet ports in one or the other of the window plates weakens that plate in the area of these ports because of the brittleness of these plates, making them subject to fracture in these areas. Breakage of these salt window plates adds considerably to the cost of these absorption cells because of the expensiveness of these plates.

A further disadvantage of conventional absorption cells is the difficulty encountered in a assembling the cells due to the necessity for accurately aligning or registering the small ports in the ported window plate, the ported gasket, and the ported pressure-applying member and the necessity for applying uniform pressure over all areas of the pressure-applying members to minimize the possibility of fracturing the ported window plates. Since the front and back window plates in the cells become blurred or fogged after repeated use or exposure to moist air, they require re-polishing from time to time. Before this can be done in conventional cells, the window plates must be removed from the cell. This requires disassembly of the cell and the reassembly thereof upon completion of the polishing. These cells must also be disassembled occasionally to thoroughly clean the sample chamber. The cell must also be disassembled and then reassembled when the spacer between the window plates is to be changed to vary the thickness of the sample chamber. Every time the cell is reassembled there is considerable likelihood that the expensive ported window plate will be fractured in applying the necessary pressure to seal the assembly at the interface between the drilled sealing gasket and the ported pressure-applying member in contact therewith.

The difficulties encountered in assembling or in reassembling known infrared absorption cells and the portion of the cost of manufacture of these cells attributable to the cost of drilling the ports and passages as aforesaid are eliminated in the cell of the present invention by locating the ingress and egress ports for the sample chamber in the spacer. As a result, the need for passages or ports in the metal pressure-applying members and in a window plate and any gaskets that may be used, and the need for bringing ports in the various parts into registering alignment when the cell is being assembled, are eliminated. Moreover, the elimination of the junction between the drilled gasket and the ported pressure-applying member, which junction was the most troublesome site of leakage and of corrosion in prior cells, also eliminates the need for heavy pressure-applying members and the need for the use of stainless steel which is expensive and also costly to machine.

Accordingly, an object of the invention is to provide a new and improved absorption cell for analytical work, having an internal fluid-tight chamber for holding the sample to be analyzed and means for establishing communication with the sample chamber solely through the spacer.

A further object of the invention is to provide a new and improved absorption cell having front and back window plates separated by a spacer to define an interwindow sample chamber communicating with the exterior solely through one or more ports in the spacer and one or more hypodermic needles cooperable with the aforesaid one or more ports.

A still further object of the invention is to provide a new and improved absorption cell as above defined in which the dimensions of the port or ports may be varied to permit the connection between the port or ports and the hypodermic needle or needles for delivering or removing fluid from the fluid-tight sample chamber to be made either by projecting the needles through the ports or by abuttingly engaging the tip of the needles with the outer ends of the ports.

Another object of the invention is to provide a new and improved absorption cell, as above defined, in which the ports may be sealed in the case of the first alternative construction by plugging the hypodermic needle and in the case of the second alternative by sealing the ports with plug type closures.

A further object of the invention is to provide a new and improved absorption cell having rock salt (or other halide salt) window plates, the outer faces of which may be polished without disassembling the cell.

A more general object of the invention is to provide a new and improved absorption cell for infrared absorption or like analysis which, in comparison with existing cells for the same purpose, is of a simplified construction and made from less expensive materials substantially reducing the cost of manufacture thereof and the breakage of expensive window plates and which, nevertheless, is more efficient in use and much easier to assemble and disassemble, thereby not only reducing the cost of manufacture as aforesaid but also simplifying such maintenance as cleaning of the cell and re-polishing of the window plates as well as facilitating the changing of spacers.

These and other objects, advantages and capabilities of the invention will become apparent from the following description wherein reference is had to the accompanying drawing in which:

FIG. 1 is a perspective view of one form of the improved cell for infrared absorption analysis mounted in a detachable cell holder;

FIG. 2 is a vertical axial sectional view of the cell and detachable holder shown in FIG. 1 on an enlarged scale showing a hypodermic needle projecting through a port in the spacer;

FIG. 3 is a front elevational view of a modification of the invention;

FIG. 4 is a vertical sectional view of the cell shown in FIG. 3 taken on the line 4—4 of the latter figure;

FIG. 5 is a front elevational view of another modification of the invention;

FIG. 6 is a vertical sectional view of the modification shown in FIG. 5 taken on the line 6—6 of that view;

FIG. 7 is a vertical sectional view similar to FIG. 6 of still another modification of the invention;

FIG. 8 is a fragmentary vertical sectional view showing an abutting connection between the tip of a hypodermic needle and the periphery of a spacer between the window plates of a sample cell at the outer end of a port in the spacer;

FIG. 9 is a front elevational view of the spacer used in an absorption sample cell of the type shown in FIGS. 1, 2, and 5 to 7; and FIG. 10 is a vertical sectional view of the spacer on the line 10—10 of FIG. 9.

The forms described are illustrative of means of assembling the essential elements of the invention, namely, the ported spacer held between two window plates. Other forms can be readily constructed by those skilled in the art. Referring to FIGS. 1 and 2, the improved absorption cell there shown comprises a tubular housing member 12 and a cell window assembly 14 seated against an inwardly directed flange 16 on the rear end of the housing member by a bushing 18 threaded into the forward end of the housing member. Housing member 12 and bushing 18, thus, in effect constitute opposed pressure-applying members for applying compressing force or pressure to the opposite or front and back sides or faces of the cell window assembly 14. The cell window assembly comprises duplicate circular front and back window plates 20 and 22, respectively, separated by a relatively thin circular spacer 24 which has a generally centrally-located aperture 26 (FIG. 9) for a purpose to be described extending through the same and preferably elongated and of relatively narrow width. An annular cushioning gasket 28 is interposed between back window plate 22 and the inturned flange 16 on the housing member 12, while a similar cushioning gasket 30 is interposed between the inner end of bushing 18 and front window plate 20.

For ease of operation, the bushing 18 preferably is provided with a radially outwardly projecting circumferential flange 32 which may be knurled along its periphery. The portion of the wall of the housing member 12 which faces upwardly, as seen in FIGS. 1 and 2, has a relatively short chordal slot 34 formed therein for a purpose to be described at a position lengthwise of the housing to bring the upwardly facing peripheral edge portion of the spacer 24 into alignment or register with the longitudinal axis of the slot 34 when the cell window assembly 14 is seated against the flange 16 by the bushing 18 sufficiently firmly to form a fluid-tight seal between window plates 20 and 22 and the spacer 24. Cushioning gaskets 28 and 30 protect the outwardly directed faces of the front and back window plates 20 and 22, respectively, from damage when pressure is applied thereto as before described, and the opening 26 in the spacer 24, in cooperation with the front and back window plates, forms a fluid-tight sample chamber 36 between the window plates.

Access is had to this fluid-tight chamber 36 by means of passages or ports in the spacer 24. Preferably a pair of duplicate passages or ports 38 and 40 is provided in the spacer 24 communicating with one of the narrow ends of the chamber as shown in FIG. 9. Samples of fluids to be tested may be admitted to or withdrawn from the sample chamber 36 through one of these ports, such as the port 38, for example. The other port 40 is provided to vent air from the sample chamber 36 while it is being filled with liquid through the port 38. If desired, samples to be removed from chamber 36 may be withdrawn through the second passage or port 40. The cell window assembly 14 is arranged in the housing member 12 to bring the ported area in the spacer 24 into register with the chordal slot 34 in the cell housing 12 so that the outer ends of the ports 38 and 40 are accessible from the exterior and the longitudinal axis of the chamber 36 is vertically disposed.

Fluid is delivered to and removed from the sample chamber 36 and this chamber may be vented through through these ports 38 and 40 with the aid of hypodermic needles 42. In FIGS. 1 and 2, these needles are shown projecting through the ports 38 and 40 in the spacer 24 and into the sample chamber 36. This can only be done if the spacers are somewhat thicker than the diameter of the needles 42. However, it is contemplated that spacers approximating the thickness of the hypodermic needles 42 will be used when it is desired to provide an extremely narrow or thin sample chamber. Such a spacer is shown at 44 in FIG. 8 on a much enlarged scale. Ports or passages, one of which is shown at 46 in this view, are provided in this thin spacer which are of less diameter than the hypodermic needle shown at 48 in this view so that the needle cannot be received in this port. In such a case, connection can be made between the needle 48 and the inlet to the port or passage 46 by abutting the tip of the needle 48 against the outer periphery of the spacer 44 in alignment with the port or passage 46 as shown in FIG. 8. It is to be understood that the passages or ports drilled in a spacer which is of greater thickness than the diameter of the hypodermic needles that are to be used for injecting or withdrawing samples of fluid under test need not necessarily be large enough to receive the hypodermic needles in view of the alternative method of making connection between the needle 48 and the port 46, as shown in FIG. 8 and described above.

After the sample chamber 36 (FIG. 2) has been filled, it may be sealed by plugging the outer end of the needle 42 in any suitable manner as by a close-fitting plug of the type shown at 50 in that view. The sample chamber shown at FIG. 8 may be sealed by plugging the port 46 with an elongated wire-like plug-type closure as shown at 52 in FIG. 7, for example. This means of sealing the chamber may also be used in the case of ports large enough to receive a needle. When the port is to be sealed, the needle may be removed and a plug-type closure inserted in the port.

Absorption cells of the type above-described may be used in various conventional commercially available spectrophotometers, such as the apparatus made by Beckman Instruments, Inc., Fullerton, California, under the designation IR-5, or the Perkin-Elmer 221 apparatus made by the Perkin-Elmer Corporation, Norwalk, Connecticut. Since this apparatus is of known construction and forms no part of the present invention, disclosure thereof is believed to be unnecessary.

Referring to FIGS. 1 and 2, there is shown an absorption cell mounting plate 54 having rabbeted longitudinal edges forming flanges 56 which are adapted to be received in vertically extending grooves or slideways in the cell holder of a spectrophotometer. Mounting plate 54 has a circular aperture 58 (FIG. 2) dimensioned snugly to receive the rear end of cell housing 12 so as to support the same in a position normal to mounting plate 54. A suitable setscrew 60 may be provided in mounting plate 54 releasably to lock together the cell and mounting plate at a position of relative adjustment which will bring the chordal slot 34 uppermost or at any other desired position when the mounting plate 54 with the absorption cell mounted therein is placed in position in the cell holder of a spectrophotometer and will also result in the absorption cell being held in operative position relative to the rest of the apparatus.

The housing member 12, bushing 18 and mounting plate 54 may be made from any suitable lightweight and inexpensive metal such as aluminum or any other suitable lightweight and inexpensive material. In contrast to this, the metallic parts of conventional absorption cells were required to be made of stainless steel, because they had to be resistant to the corrosive action of the salt or other halide window plates and the liquids under test. It will be understood that the ports 38 and 40 in the spacer 24 may be located at positions other than those shown in FIG. 9, and that chordal slots or openings may be provided in the housing 12, similar to the slot 34 aligned with these ports so that the latter are accessible to hypodermic needles. For example, in some cases, it may be desirable to locate the vent 40 for the sample chamber diametrically opposite the inlet port 38. In that case, two access openings may be provided in the housing member 12 somewhat shorter in length than the opening 34 shown in FIG. 1 and located at diametrically opposite points in the wall of the housing 12.

The window plates used in infrared analytical work are made from crystallized molten rock salt (or other halide salt) polished on the opposite faces thereof so as to be transparent to infrared rays. In one embodiment of the invention, these plates were approximately 29 mm. in diameter and approximately 5 mm. thick.

In the conventional absorption cells, the window plates were required to have one or more small drilled ports located to communicate with the sample chamber formed between the plates. Because of the brittleness of these plates and the fact that these ports were required to register accurately with ports in one of the pressure-applying members for the cell, drilling of these ports presented difficulties that increased the cost of these parts considerably. In addition, the presence of these ports weakened the window plates in the areas of the ports making them subject to fracture in these areas and thus adding to replacement and maintenance expenses. All of these disadvantages of the conventional absorption cell are eliminated in the cell of the present invention by the elimination of the need for ports in the window plates, the gaskets, and the mounting plates or pressure-applying members.

In past experience with conventional absorption cells, it was found that leakage at the interface between the ported window plate, the pressure-applying member or plate cooperating therewith and the gasket between these parts was harder to prevent than leakage between the window plates and spacer and required greater pressure to prevent leakage than the pressure required to seal the spacer and window plates. By eliminating the need for ports in the window plates used in the cell of the present invention, the amount of pressure required to be applied to these plates may be reduced, as compared to conventional cells, to that required to form a fluid-tight seal between the window plates and spacer, thereby reducing the likelihood of fracture of the window plates during assembly or reassembly of the absorption cell and allowing the use of thinner window plates.

The above-mentioned tendency toward leakage in prior absorption cells at the interface between the ported window plates and the gasket and pressure-applying member cooperating therewith required what amounted to optical polishing of the pressure member, thereby additionally increasing the cost of manufacture of conventional absorption cells. Elimination of ports in the window plates, gasket and pressure-applying members also simplifies the original assembly of an absorption cell because it eliminates the need for bringing the ports in the several parts accurately into registration. Maintenance which requires dismantling and reassembly of the absorption cell is also simplified for the same reason. Such dismantling and reassembly may be necessary on occasion thoroughly to clean the sample chamber 36 or to polish the window plates 20 and 22 when they become fogged accidentally, or as the result of continued use. Dismantling and reassembly are also necessary when the spacer 24 is to be changed to vary the width of the sample chamber 36. Since less pressure is required on the window plates of the cell of the present invention to seal the sample chamber 36 as heretofore explained, fracture or breakage of the window plates is less likely to occur than when they are subjected to the greater pressure required to seal a sample chamber which has a ported window plate.

The spacer 24 may be made from polyethylene or any other suitable material, the thickness of the spacer used being dependent on the width of the sample chamber desired. In practice, the spacers vary in thickness usually not exceeding 3 millimeters. Polyethylene or any other suitable material may also be used in making the cushioning gaskets 28 and 30. The polytetrafluoroethylene resin commercially available under the name of "Teflon," for example, is another suitable material for these purposes.

Referring now to FIGS. 3 and 4, a simplified modification of the invention is shown which is particularly adaptable for the use of square or rectangular window plates, although the principles embodied therein may be applied to the construction of an absorption cell in which circular window plates are to be used. In this form of the invention, the cell assembly comprises duplicate rectangular front and back rock salt (or other halide salt) window plates 62 and 64, separated by a rectangular spacer 66 having an aperture 68 which may be similar in contour to the aperture 26 in the spacer 24 previously described.

This cell assembly is directly anchored to a mounting plate 70 by means of a front clamping member or plate 72 and four clamping screws 74 passing through the front clamping member 72 and threaded into the mounting plate 70. Cushioning gaskets 76 are interposed between the front clamping member 72 and front window plate 62 and between the back window plate 64 and the mounting plate 70 to protect the window plates when the clamping screws 74 are turned up enough to force the window plates into fluid-tight sealing engagement with the spacer 66. When this is done, a fluid-tight chamber 78 is formed between the window plates 62 and 64 bounded by the periphery of the aperture 68 in the spacer. The front clamping member 72 is of open frame-like construction to provide an aperture 80 through which radiation is free to pass, and the mounting plate 70 which forms the back pressure-applying member has an aperture 82 at least as large as the aperture 68 in the spacer 66 so that no part of the fluid-tight chamber 78 formed between the window plates 62 and 64 is masked by the mounting plate.

Fluid is admitted to and may be withdrawn from the fluid-tight chamber 78 through one or more ports with the aid of hypodermic needles similar to the needles 42 utilized in the first embodiment of the invention, two of these needles being shown at 84 in FIG. 3. These ports, one of which is shown at 86 (FIG. 4) may be drilled or otherwise formed in the spacer 66. If the spacer is relatively thick, the port 86 may be made large enough to receive the needle 84, as indicated in FIG. 4, but when the spacer is too thin to permit this to be done, a connection may be made between the tip of the hypodermic needle and the port by bringing the needle into abutting engagement with the spacer in encompassing relation to the inlet end of the port in the manner previously described for the modification shown in FIG. 8.

This cell may be mounted in a spectrophotometer in the same manner as the cell previously described. For this purpose, the mounting plate 70 may be provided with flanges 88 on opposite peripheral edges thereof dimensioned to be received in the slideways of a cellholder in a spectrophotometer.

Since the outer periphery of the spacer 66 is exposed throughout most of its length in this form of the invention, this modified cell is easier to assemble than the cell first described because it is not necessary for the one or more ports in the spacer to be aligned with a fixedly located aperture such as the chordal slot 34 previously described, although it is preferable that the one or more ports be on the upwardly facing side of the cell as shown in FIG. 3.

The modification of the invention disclosed in FIGS. 5 and 6 includes annular front and back pressure applying members 90 and 92, respectively, drawn into pressure applying relation with front and back window plates 94 and 96, respectively, by three equidistantly spaced clamping screws 98, the heads of which are countersunk in the front face of the front clamping member 90. As in the previously-described embodiments of the invention, a spacer 100 is provided between the front and back window plates 94 and 96, respectively, having an aperture 102 which defines the boundary of a fluid-tight chamber 104 between the front and back window plates when the latter are drawn together firmly enough to form a fluid-tight seal with the spacer. To protect the front and back window plates 94 and 96, respectivley, from damage by the pressure-applying members 90 and 92, cushioning gaskets 106 and 108 between the front and back pressure-applying members, respectively, and the front and back window plates are provided.

Access may be had to the fluid-tight chamber 104 through one or more ports in the spacer 100, one of which is shown at 110 in FIG. 6, and one or more hypodermic needles 112 may be provided to cooperate with these one or more ports in the manner shown in either FIG. 2 or FIG. 8 to inject fluid into the fluid-tight chamber 104 between window plates 94 and 96, or withdraw fluid from this chamber.

This absorption cell is removably secured to a mounting plate similar to the mounting plate 54 shown in FIGS. 1 and 2 by means of an adapter 114 fixed to the back side of the back pressure-applying member 92 by means of a plurality of screws 116. The adapter 114 has a rearwardly extending flange 118 adapted to be snugly received in a suitable aperture in the mounting plate.

Referring to FIG. 6, it will be noted that the front side of the front window plate 94 and the back side of the back window plate 96 are peripherally recessed as indicated at 120 to receive the front and back pressure applying members 90 and 92 so that the front face of the front window plate 94 and the back face of the back window plate 96 lie in planes disposed outwardly of the planes of the front and back pressure-applying members. The front and back sides of these window plates, therefore, are in a position to be polished without dismantling the cells. This is an advantage inherent in this third modification of the invention in addition to the advantages above set forth of the first two modifications of the invention.

This advantage is also inherent in the modification disclosed in FIG. 7 which comprises a tubular housing member 122 having an inturned flange 124 on its rear end defining a rear window 126 and a bushing 128 threaded on the housing member 122 and having an inturned flange 130 defining a front window 132. A cell assembly comprising front and back window plates 134 and 136 separated by an apertured spacer 138 is clamped between the flanges 124 and 130 when the bushing 128 is turned up on the housing 122. As in the previously described embodiments of the invention, cushioning gaskets 140 are provided between the flanges 124 and 130 and the front and back window plates 134 and 136, respectively. When the bushing 128 is turned up far enough to form a fluid-tight seal between window plates 134 and 136 and the spacer 138, a fluid-tight chamber 142 is formed between the window plates bounded by the periphery of aperture 144 in the spacer 138.

This chamber may be filled or emptied through one or more ports in the spacer 138 in the manner described for the other embodiments of the invention. A single port 146 is shown in FIG. 7 for this purpose. This port may be closed by the plug-type closure 52, as shown in FIG. 7, and previously described. As in the first described modification of the invention (FIGS. 1 and 2), access is had to the port 146 in the spacer 138 through a chordal slot 148 in the cylindrical wall of the housing member 122. The front face of the front window plate 134 and the rear face of the back window plate 136 are peripherally recessed to receive the inturned flanges 124 and 130, respectively, so that the front face of the front window plate 134 and the rear face of the back window plate 136 lie in planes positioned outwardly of the flanges 124 and 130. By virtue of this construction, these faces of the two window plates 134 and 136 may be polished without dismantling the cell. In this respect, therefore, the modification shown in FIG. 7 resembles that shown in FIGS. 5 and 6.

The pressure-applying or housing members in each of the modifications shown in FIGS. 3 to 7 may be made from any suitable light-weight and inexpensive material such as aluminum, and the window plates, spacers and gaskets used in these modifications may be made of the same materials as the corresponding parts of the first modification. These modifications have all the other previously mentioned advantages of the first embodiment of the invention over conventional cells, and they may be utilized in the same manner and for the same purposes as the first embodiment. Since the advantages and utility of the first embodiment of the invention were set forth in detail in connection with the description of that embodiment, they will not be repeated here.

While a preferred embodiment of the invention has been shown and described, it will be apparent that variations and modifications thereof may be made without departing from the underlying principles of the invention, It is desired, therefore, by the following claims, to include within the scope of the invention, all such variations and modifications by which substantially the results of the invention may be obtained through the use of substantially the same or equivalent means.

I claim:

1. An absorption cell comprising opposed front and back window plates of a material transparent to a predetermined radiation, a relatively thin spacer between said front and back window plates having a generally centrally located aperture extending through said spacer, front and back pressure-applying means for forcing said front and back window plates into fluid-tight sealing engagement with said spacer so that a fluid-tight chamber is formed between said plates bounded by the periphery of the aperture in said spacer, the areas of contact between said pressure-applying means and said window plates being located outwardly of the periphery of the aperture in said spacer so that said window plates are free of obstruction to the passage of radiation therethrough at least throughout the area of the said plates which is coextensive with said fluid-tight chamber, means for establishing communication with said fluid-tight chamber solely through said spacer including one or more tubulate ports in the said spacer and one or more hypodermic needles cooperable with said one or more ports to deliver or withdraw fluid from said sealed chamber, and means for closing said means for establishing communication to said fluid-tight chamber, said spacer being made of a material sufficiently rigid and non-compressible to prevent collapse of said ports when pressure sufficient to form a fluid-tight seal between said spacer and window plates is applied to the latter.

2. An absorption cell comprising opposed front and back window plates of a material transparent to a predetermined radiation, a relatively thin spacer between said front and back window plates having a generally centrally located aperture extending through said spacer, front and back pressure-applying means for forcing said front and back window plates into fluid-tight sealing engagement with said spacer so that a fluid-tight chamber is formed between said plates bounded by the periphery of the aperture in said spacer, the areas of contact between said pressure applying means and said window plates being located outwardly of the periphery of the aperture in said spacer so that said window plates are free of obstruction to the passage of radiation therethrough at least throughout the area of the said plates which is coextensive with said fluid-tight chamber, means for establishing communication with said fluid-tight chamber solely through said spacer including one or more tubulate ports in said spacer and one or more hypodermic needles to cooperate with said one or more ports and alternate means to seal said means for establishing communication with said fluid-tight chamber including close-fitting plug-type closures for said hypodermic needles and removable wire-like plug-type closure means to seal tubulate ports not sealed by plugged hypodermic needles, said spacer being made of a material sufficiently rigid and non-compressible to prevent collapse of said ports when pressure sufficient to form a fluid-tight seal between said spacer and window plates is applied to the latter.

3. An absorption cell comprising opposed front and back window plates of a material transparent to a predetermined radiation, a relatively thin spacer between said front and back window plates having a generally centrally located aperture extending therethrough, front and back pressure applying means for forcing said front and back window plates into fluid-tight sealing engagement with said spacer so that a fluid-tight chamber is formed between said plates bounded by the periphery of the aperture in said spacer, cushioning gaskets between said front and back pressure applying means and the faces of the said window plates engaged thereby, the areas of contact between said window plates and gaskets and between the latter and said pressure applying means being located outwardly of the boundary of the said aperture in said spacer so that the said window plates are free of obstruction to the passage of radiation therethrough at least throughout the area of the said plates which is coextensive with said fluid-tight chamber, means for establishing communication with said fluid-tight chamber solely through said spacer including one or more tubulate ports in the said spacer and one or more hypodermic needles cooperable with said one or more ports to deliver or withdraw fluid from said fluid-tight chamber and means for closing said means for establishing communication to said fluid-tight chamber, said spacer being made of a material sufficiently rigid and non-compressible to prevent collapse of said ports when pressure sufficient to form a fluid-tight seal between said spacer and window plates is applied to the latter.

4. A spectrophotometric absorption cell comprising opposed front and back window plates of a material transparent to a predetermined radiation, a relatively thin spacer between said front and back plates having a generally centrally located aperture extending therethrough, front and back pressure applying means for forcing said front and back window plates into fluid-tight sealing engagement with said spacer so that a fluid-tight chamber is formed between said plates bounded by the periphery of the aperture in said spacer, the areas of contact between said pressure applying means and said window plates being located outwardly of the periphery of the aperture in said spacer so that the said window plates are free of obstruction to the passage of radiation therethrough at least throughout the area of the said plates which is coextensive with said fluid-tight chamber, means for delivering fluid to or from said fluid-tight chamber including one or more tubulate ports in said spacer and one or more hypodermic needles cooperable with said one or more ports, means for closing said means for establishing communication to said fluid-tight chamber, said spacer being made of a material sufficiently rigid and non-compressible to prevent collapse of said ports when pressure sufficient to form a fluid-tight seal between said spacer and window plates is applied to the latter and means for removably mounting the aforesaid absorption cell assembly in a fixed position in a spectrophotometer.

5. An absorption cell comprising an open ended housing having inwardly directed abutment forming structure adjacent to one end thereof, a radiation transparent cell assembly disposed transversely of said housing including front and back window plates and a relatively thin spacer between said window plates having a generally centrally located aperture extending through the said spacer, a clamping member movable endwise of said housing for seating said cell assembly against the said inwardly directed abutment-forming structure with sufficient force to form a fluid-tight seal between said window plates and spacer so that a narrow fluid-tight chamber bounded by the periphery of the aperture in said spacer is formed between said plates, said inwardly directed abutment-forming structure defining a rear window for said cell assembly and said clamping member being hollow to define a front window, and means for delivering fluid to or withdrawing fluid from said fluid-tight chamber including one or more tubulate ports in said spacer and one or more hypodermic needles cooperable with said one or more ports, said spacer being made of a material sufficiently rigid and non-compressible to prevent collapse of said ports when pressure sufficient to form a fluid-tight seal between said spacer and window plates is applied to the latter.

6. An absorption cell comprising a cylindrical threaded housing having an inwardly directed flange on one end thereof, a diametrically disposed cell assembly in said housing including front and back radiation transparent window plates and a relatively thin spacer between said window plates, said spacer having a centrally located aperture, a bushing threadable into said housing for seating said cell assembly against the said inwardly directed flange with sufficient force to form a fluid-tight seal between said window plates and spacer so that a narrow fluid-tight chamber bounded by the inner periphery of said spacer is formed between said plates, the inner peripheries of said bushing and said inwardly directed flange defining front and back windows respectively for the chamber and means for delivering fluid to or withdrawing fluid from said fluid-tight chamber including one or more tubulate ports in said spacer and one or more hypodermic needles cooperable with said one or more ports, said spacer being made of a material sufficiently rigid and non-compressible to prevent collapse of said ports when pressure sufficient to form a fluid-tight seal between said spacer and window plates is applied to the latter.

7. An absorption cell as defined in claim 6 wherein the housing has one or more relatively short chordal slots in one portion thereof located at a position axially of the housing to align diametrically with the spacer when the cell assembly is seated by said bushing and wherein said one or more hypodermic needles project radially through said one or more chordal slots and said spacer.

8. A spectrophotometric absorption cell comprising opposed generally annular shaped front and rear clamping members, a cell assembly including circular front and back radiation transparent window plates and a relatively thin spacer between said window plates having a generally centrally located aperture, means for drawing said clamping members into clamping engagement with the peripheral edges of the forwardly and rearwardly facing sides of said front and back window plates, respectively, with sufficient force to form a fluid-tight seal between said window plates and spacer so that a narrow fluid-tight chamber is formed between said plates bounded by the periphery of the aperture in said spacer, means for establishing communication with said fluid-tight chamber solely through said spacer including one or more tubulate ports extending generally radially of the spacer, said spacer being made of a material sufficiently rigid and non-compressible to prevent collapse of said ports when pressure sufficient to form a fluid-tight seal between said spacer and window plates is applied to the latter and a mounting plate having a circular aperture therein snugly to receive one of said clamping members fixedly but releasably to support said cell assembly in a normal position relative to said plate, said plate being adapted to be releasably mounted in a spectrophotometer.

9. A spectrophotometric absorption cell comprising opposed front and back window plates of a material transparent to a predetermined radiation, a relatively thin spacer between said front and back window plates having a generally centrally located aperture extending therethrough, a flat plate-like first pressure-applying member, a second flat pressure-applying member, a plurality of clamping screws passing freely through one of said clamping members and threadably engageable in the other for drawing the said two clamping members together with sufficient force to press said front and back window plates into fluid-tight sealing engagement with said spacer so that a fluid-tight chamber is formed between said window plates bounded by the periphery of the aperture in said spacer, said two pressure-applying members having window-forming apertures through which radiation may freely pass to and from said fluid-tight chamber when the said clamping members are in window-clamping position and the peripheral edge of said spacer then being exposed to access throughout substantially its entire extent, and means for establishing communication with said fluid-tight chamber solely through said spacer including one or more tubulate ports in said spacer and one or more hypodermic needles cooperable with said one or more ports, said spacer being made of a material sufficiently rigid and non-compressible to prevent collapse of said ports when pressure sufficient to form a fluid-tight seal between said spacer and window plates is applied to the latter, said first plate-like clamping member being adapted to be removably received in the cell holder of a spectrophotometer removably to mount said cell assembly in a fixed operative position in the said spectrophotometer.

10. A spectrophotometric absorption cell comprising circular front and back radiation transparent window plates, a relatively thin semi-rigid and relatively non-compressible spacer between said plates having a generally centrally located aperture, opposed flat generally annular shaped front and back clamping members, a plurality of clamping screws for drawing said front and back clamping members into pressure-applying relation with said front and back window plates, respectively, sufficiently firmly to force said window plates into fluid-tight sealing relation with said spacer so that a fluid-tight chamber is formed between said plates bounded by the periphery of the aperture in said spacer, said front and back window plates being peripherally recessed to receive said front and back clamping members, respectively, in substantially centered relation with respect to the center of the said fluid-tight chamber so that the front side of said front window plate and the back side of said back window plate lie in planes disposed outwardly of said pressure-applying members thereby making these sides of the window plates accessible for polishing without dismantling the cell, means for establishing communication with said fluid-tight chamber solely through said spacer including one or more tubulate ports in said spacer and one or more hypodermic needles to cooperate with said one or more ports, and absorption cell mounting means projecting rearwardly from said back clamping member.

11. A spectrophotometric absorption cell comprising front and back window plates of a material transparent to a predetermined radiation, a relatively thin semi-rigid and relatively non-compressible spacer between said front and back window plates having a generally centrally located aperture, opposed pressure-applying means for drawing said front and back window plates together sufficiently firmly to form a fluid-tight seal with said spacer so that a fluid-tight chamber is formed between said plates bounded by the periphery of the aperture in said spacer, the portions of said pressure-applying means applying pressure to said window plates being located outwardly of the periphery of the aperture in said spacer so as not to interfere with the passage of radiation to and from said fluid-tight chamber and said front and back window plates being recessed to receive the said pressure-applying portions of said pressure-applying means so that the front side of said front window plate and the back side of said back window plate lie in planes disposed outwardly of the said pressure-applying portions so as to be accessible for polishing without dismantling the cell, and means for establishing communication with said fluid-tight chamber solely through said spacer including one or more tubulate ports in said spacer and one or more hypodermic needles cooperable with said one or more ports.

12. A spectrophotometric absorption cell comprising front and back window plates of a material transparent to a predetermined radiation, said front window plate having a peripheral recess in the forwardly facing side thereof and said back window plate having a similar recess in its rearwardly facing side, a relatively thin semi-rigid and relatively non-compressible spacer between said front and back window plates having a generally centrally located aperture, opposed front and back pressure applying means for forcing said front and back window plates into fluid-tight sealing engagement with said spacer so that a fluid-tight chamber is formed between said plates bounded by the periphery of the aperture in said spacer, said front and back pressure-applying means including parts of open frame-like construction to seat in the recessed peripheral edge portions of said front and back window plates, respectively, and of less thickness than the depth of said recesses, so that the areas of said front and back window plates encompassed by the recessed portions thereof lie exposed in planes disposed outwardly of the plane of said front and back pressure-applying means, making these areas accessible for polishing without dismantling said cell, and means for passing fluid to and from said fluid-tight chamber including one or more tubulate ports in said spacer.

References Cited in the file of this patent

UNITED STATES PATENTS

| | | |
|---|---|---|
| 2,637,817 | Herbert | May 5, 1953 |
| 2,690,695 | Coates | Oct. 5, 1954 |
| 2,766,614 | Cook | Oct. 16, 1956 |
| 2,819,402 | Watson et al. | Jan. 7, 1958 |
| 2,892,086 | Carter | June 23, 1959 |